United States Patent [19]

Gergets

[11] Patent Number: 5,494,416

[45] Date of Patent: Feb. 27, 1996

[54] MAGNETICALLY DRIVEN POSITIVE DISPLACEMENT PUMP AND THRUST BEARING ASSEMBLY

[75] Inventor: Paul Gergets, Dyer, Ind.

[73] Assignee: Tuthill Corporation, Chicago, Ill.

[21] Appl. No.: 346,848

[22] Filed: Nov. 30, 1994

Related U.S. Application Data

[63] Continuation of Ser. No. 152,291, Nov. 12, 1993, abandoned.

[51] Int. Cl.[6] ............................ F04B 17/00; F04B 39/14
[52] U.S. Cl. ...................... 417/420; 417/365; 417/410.3; 384/420
[58] Field of Search .................................. 417/420, 365, 417/319, 359, 410.3; 384/420

[56] References Cited

U.S. PATENT DOCUMENTS

| | | | |
|---|---|---|---|
| 1,725,401 | 8/1929 | Layne | 417/359 |
| 2,827,855 | 3/1958 | Rankin | 417/359 |
| 2,877,945 | 3/1959 | Trebilcock | 384/420 |
| 3,238,878 | 3/1966 | Martin . | |
| 3,664,758 | 5/1972 | Sato | 417/365 |
| 3,736,075 | 5/1973 | Otto . | |
| 4,013,384 | 3/1977 | Oikawa . | |
| 4,036,565 | 7/1977 | Becker | 417/420 |
| 4,047,847 | 9/1977 | Oikawa . | |
| 4,065,235 | 12/1977 | Fulong et al. . | |
| 4,080,112 | 3/1978 | Zimmermann | 417/420 |
| 4,407,641 | 10/1983 | Long . | |
| 4,487,557 | 12/1984 | Ruyak et al. | 417/420 |
| 4,871,301 | 10/1989 | Buse | 417/420 |
| 5,160,246 | 11/1992 | Horiuchi | 417/365 |
| 5,165,868 | 11/1992 | Gergets et al. | 417/366 |
| 5,256,038 | 10/1993 | Fairman | 417/423.11 |
| 5,263,829 | 11/1993 | Gergets | 417/420 |

FOREIGN PATENT DOCUMENTS 3237291  10/1991  Japan .

*Primary Examiner*—Richard A. Bertsch
*Assistant Examiner*—William Wicker
*Attorney, Agent, or Firm*—Lee, Mann, Smith, McWilliams, Sweeney & Ohlson

[57] ABSTRACT

A positive displacement pump and thrust bearing assembly having a housing defining an internal fluid chamber having front and rear inner walls. A rotor having a front face and a rear face is positioned in the fluid chamber. Each of the faces of the rotor is spaced apart from a corresponding inner wall of the fluid chamber to define predetermined clearances therebetween. A shaft is connected at a first end to the rotor to effect rotation thereof. A sealed container surrounds and encloses a second end of the shaft and is in fluid communication with the fluid chamber. The thrust bearing assembly is positioned within the container and includes an adjusting sleeve and an adjusting plate. The adjusting sleeve is attachable to the housing and includes a central bore through which the shaft extends. The adjusting plate is connectable to the shaft such that the sleeve is located between the housing and the adjusting plate. The adjusting plate is rotatable with the shaft and is in relative rotatable engagement with the stationary seat. The adjusting sleeve and the adjusting plate prevent movement of the shaft and the rotor in a direction away from the adjusting sleeve and toward the rear inner wall of the fluid chamber such that the predetermined clearances between the faces of the rotor and the internal walls of the housing are substantially uniformly maintained as the rotor rotates.

11 Claims, 1 Drawing Sheet

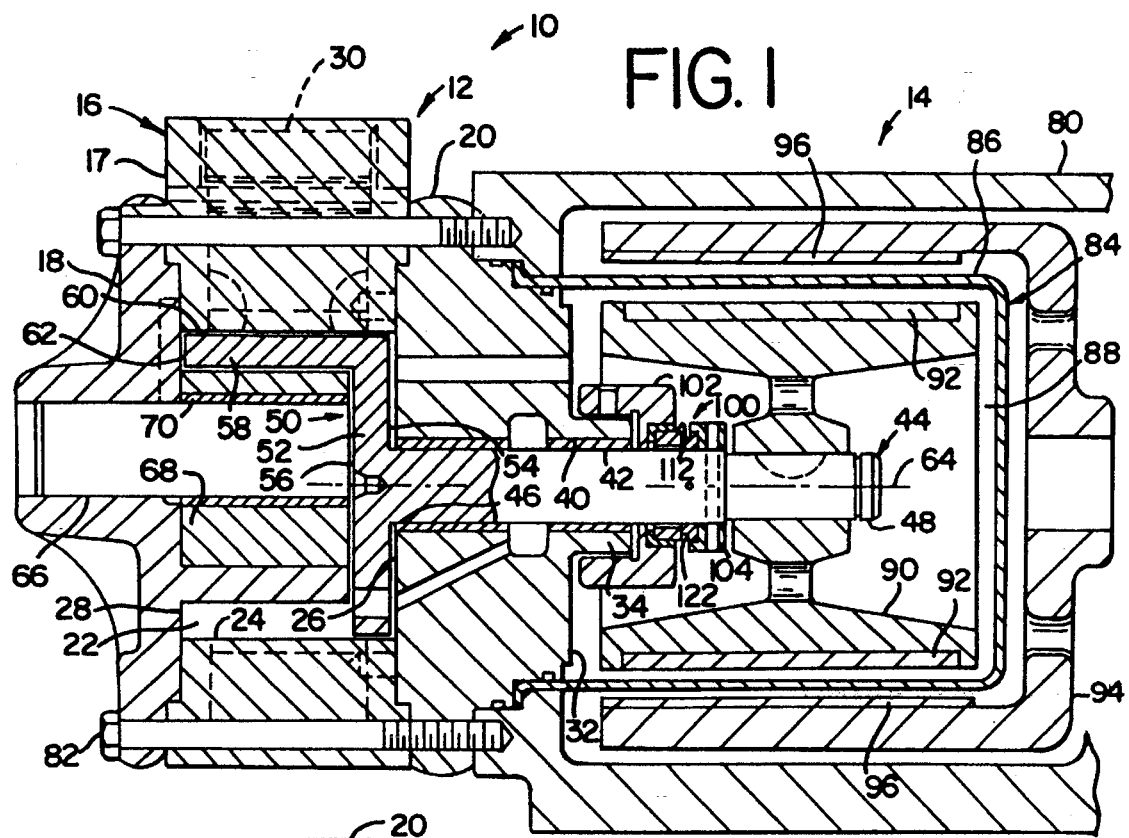

MAGNETICALLY DRIVEN POSITIVE DISPLACEMENT PUMP AND THRUST BEARING ASSEMBLY

This application is a continuation of application Ser. No. 08/152,291, filed Nov. 12, 1993 now abandoned.

BACKGROUND OF THE INVENTION

The present invention relates to a magnetically driven positive displacement pump and thrust bearing assembly and in particular to a magnetically driven positive displacement pump having a thrust bearing assembly located within the fluid chamber of the pump for controlling rotor clearances with the cover and bracket faces of the fluid chamber.

The optimum clearances between the rotor and the cover and bracket faces in a positive displacement pump must be closely maintained during operation of the pump as these clearances are critical to providing a consistent flow of fluid from the pump. Centrifugal pumps, as opposed to positive displacement pumps, do not require that clearances between the rotor and the cover and bracket faces of the pump fluid chamber be as closely maintained during operation in order to provide a consistent flow of fluid from a centrifugal pump. Magnetically driven positive displacement pumps are shown and described in U.S. Pat. No. 5,165,868, issued Nov. 24, 1992, and U.S. Pat. No. 5,263,829, issued Nov. 23, 1993, both of which are assigned to Tuthill Corporation of Chicago, Ill., the applicant herein.

During operation of a positive displacement gear pump the rotor may be pushed towards the cover of the pump by a thrust force created by hydraulic loading on the rotor. The hydraulic loading on the rotor and the resulting thrust force are inherent in the design and operation of a positive displacement gear pump. The magnitude of the thrust force pushing the rotor towards the cover increases as the diameter of the rotor increases and as the pressure of the pumped fluid increases. As the rotor is pushed towards the cover, the clearances between the rotor and the cover and bracket faces of the pump chamber are changed thereby changing the operating efficiency of the pump. The rotor may also be forced into contact with the cover resulting in damage to the pump. The use of a thrust bearing in a magnetically driven positive displacement pump is made additionally difficult due to the exposure of the thrust bearing to the pumped fluid which may contain particulates or which may have poor lubricating qualities resulting in premature wear to the bearing.

SUMMARY OF THE INVENTION

The present invention provides a magnetically driven positive displacement pump including a housing defining an internal fluid chamber having front and rear inner walls and a rotor positioned in the fluid chamber for rotation therein. The rotor includes a front face and a rear face, with each rotor face being spaced apart from a corresponding inner wall of the fluid chamber to define a predetermined clearance therebetween. A shaft is connected at a first end to the rotor to provide rotation of the rotor. A sealed canister is attached to the housing and surrounds and encloses a second end of the shaft. A cooling fluid chamber is located within the sealed container and is in fluid communication with the fluid chamber in the housing.

A thrust bearing assembly is positioned within the canister. The bearing assembly includes an adjusting sleeve and an adjusting plate. The adjusting sleeve is selectively attachable to the housing and includes a central bore through which the shaft extends. The adjusting sleeve includes a stationary seat which extends around the shaft. The adjusting plate is connected to the shaft for rotation therewith such that the adjusting plate is in relative rotatable engagement with the stationary seat. The adjusting sleeve is positioned between the housing and the adjusting plate. The adjusting sleeve and the adjusting plate prevent movement of the shaft and the rotor in a longitudinal direction toward the cover of the fluid chamber and away from the adjusting sleeve such that the predetermined clearances between the faces of the rotor and the cover and bracket faces are substantially uniformly maintained as the rotor rotates. The adjusting sleeve is selectively attachable to the housing such that when the adjusting sleeve is not attached to the housing the adjusting sleeve may be positioned at various distances as desired from the cover and bracket faces of the fluid chamber to provide for adjustment of the clearances between the rotor and the cover and bracket faces, and such that when the adjusting sleeve is attached to the housing the adjusting sleeve will maintain the desired clearances during operation of the pump.

DESCRIPTION OF THE DRAWINGS

FIG. 1 is a partial cross-sectional view of the magnetically driven positive displacement pump and thrust bearing assembly of the present invention.

FIG. 2 is an enlarged partial cross-sectional view of the thrust beating assembly.

DESCRIPTION OF THE PREFERRED EMBODIMENT

FIG. 1 shows a magnetically driven positive displacement pump 10 including a positive displacement pump unit 12 coupled to a magnetic drive unit 14. The positive displacement pump unit 12 and the magnetic drive unit 14 are constructed and operate as generally shown and described in U.S. Pat. Nos. 5,165,868 and 5,263,829 which are incorporated herein by reference.

The positive displacement pump unit 12 includes a housing 16, a cover 18 attached to the left side of the housing 16 and a bracket 20 attached to the right side of the housing 16. An internal fluid chamber 22 is formed within the housing 16 between the cover 18 and the bracket 20. The internal fluid chamber 22 is formed by a sidewall 24 located on the housing 16, a rear inner wall 26 located on the bracket 20 and a front inner wall 28 located on the cover 18. The housing 16 includes an inlet port (not shown) and an outlet port 30 shown in phantom in FIG. 1 both of which are in communication with the fluid chamber 22.

The bracket 20 also includes an outer wall 32 and a generally cylindrical stem 34 projecting perpendicularly outwardly from the outer wall 32. The stem 34 includes a cylindrical outer surface 36, an annular end surface 38 and a bore 40 which extends concentrically within the stem 34 and through the bracket 20. One or more bushings 42 are located in the bore 40.

The positive displacement pump unit 12 also includes a shaft 44 having a first end 46 and a second end 48. The shaft 44 extends through the bore 40 in the bracket 20 and is rotatably supported by the bushings 42. A rotor 50 is attached to the first end 46 of the shaft 44 and is located in the fluid chamber 22. The rotor 50 includes a generally circular base 52 having a rear face surface 54 which is spaced apart from and parallel to the rear inner wall 26 of the bracket 20 and a back wall surface 56. The rotor 50 also includes an outer gear 58 which extends outwardly from the edge of the base 52 generally parallel to the shaft 44. The outer gear 58 includes an external surface 60 which is spaced apart from the inner side wall 24 of the housing 16 and a front face surface 62 which is spaced apart from the front inner wall 28 of the cover 18. The clearances between the surfaces of the rotor and the internal walls of the housing 16 which form the fluid chamber 22 are shown in an exaggerated scale in FIG. 1 for purposes of illustration. The shaft 44 and the rotor 50 rotate about an axis 64 which extends longitudinally through the center of the shaft 44. A stationary pin 66 extends inwardly into the fluid chamber 22 from the cover 18. An inner gear 68 is rotatably attached to the stationary pin 66 by a bushing 70. The inner gear 68 engages the outer gear 58 in a conventional manner to provide the appropriate pumping effect.

The magnetic drive unit 14 includes an adapter casing 80 which is connected to the positive displacement pump unit 12 by fasteners 82. A sealed container 84 having a cylindrical peripheral wall member 86 is attached to the bracket 20 of the pump unit 12 and is sealed thereto. The sealed container 84 forms a cooling fluid chamber 88 therein and encloses the second end 48 of the shaft 44 in conjunction with the bracket 20. The cooling fluid chamber 88 is in fluid communication with the internal pump fluid chamber 22 in the housing 16 through a fluid path extending along the shaft 44 as described and illustrated more fully in U.S. Pat. No. 5,165,868. Additional fluid passages may be included between the cooling fluid chamber 88 and the pump fluid chamber 22 if desired. A rotary driven member 90 is located within the sealed container 84 and is connected to the second end 48 of the shaft 44 for conjoint rotation therewith. The rotary driven member 90 includes a first magnetic surface 92 extending along and spaced apart from the interior of the peripheral wall 86 of the sealed container 84. A cup-shaped rotary drive member 94 having a recess therein extends around the sealed container 84 such that the rotary driven member 90 is located within the recess of the rotary drive member 94. The rotary drive member 94 includes a second magnetic surface 96 extending along and spaced apart from the exterior of the peripheral wall 86 of the sealed container 84 for magnetic engagement with the first magnetic surface 92 of the rotary driven member 90. The remaining construction and operation of the magnetic drive unit 14 is substantially as shown and described in U.S. Pat. No. 5,165,868.

As best shown in FIG. 2, the magnetically driven positive displacement pump 10 also includes a thrust bearing assembly 100. The purpose of the thrust bearing assembly is to initially provide for the adjustment of the clearances between the rotor 50 and the walls of the fluid chamber 22 and thereafter to maintain these clearances during operation of the pump 10. The thrust beating assembly 100 includes an adjusting sleeve 102 and an adjusting plate 104. The adjusting sleeve 102 includes an annular wall 106 which is located concentrically around the stem 34 of the bracket 20. One or more set screws 108 are threadably engaged with the annular wall 106 and are adapted for selective engagement with the stem 34. The set screws 108 selectively provide a rigid connection between the adjusting sleeve 102 and the stem 34 to prevent any movement therebetween. The adjusting sleeve 102 also includes an annular flange 110 extending radially inwardly from the annular wall 106 which forms a recess with the wall 106. An annular stationary seat 112 having a bearing surface 113 is located in the recess formed by the wall 106 and flange 110 and is connected thereto by an annular insert 114. The insert 114 has a generally L-shaped cross-section. A bore 116 extends through the flange 110, insert 114 and stationary seat 112 of the adjusting sleeve 102. As shown in FIG. 2, the shaft 44 extends through the bore 116 of the adjusting sleeve 102. The stationary seat 112 is preferably made of a ceramic material although other materials such as carbon, tungsten carbide, silicon carbide or NI-Resist may be used depending upon the type of fluid located within the cooling fluid chamber 88.

The adjusting plate 104 includes an annular collar 118 having an outwardly extending circular peripheral wall 120 forming a recess therein. A seat 122 is located in the recess of the collar 118 and is attached to the collar 118. The seat 122 includes an outwardly extending circular wall 124. A bore 126 extends through the seat 122 and collar 118. The adjusting plate 104 is connected to the shaft 44 by a pin 128 which extends through a pair of aligned bores 130 in the collar 118 and a bore 132 shown in phantom in the shaft 44. The pin 128 couples the plate 104 to the shaft 44 for rotation therewith. The circular wall 124 of the adjusting plate 104 rotates and engages the bearing surface 113 of the stationary seat 112 of the adjusting sleeve 102. The seat 122 is preferably made of carbon although materials such as ceramic, tungsten carbide, silicon carbide or NI-Resist and others may be used depending upon the type of fluid located within the cooling fluid chamber 88.

The magnetically driven positive displacement pump 10 operates at optimum efficiency and provides a consistent flow of fluid from the outlet 30 of the pump unit 12 when the clearance between the rear face 54 of the rotor 50 and the rear inner wall 26 of the fluid chamber 22, and the clearance between the front face 62 of the rotor 50 and the front inner wall 28 of the fluid chamber 22, are maintained at generally constant pre-determined distances as the rotor 50 rotates about the axis 64. During assembly of the pump 10, the adjusting sleeve 102 is placed over the second end 48 of the shaft 44 such that the shaft 44 extends through the bore 116 in the adjusting sleeve 102. The adjusting sleeve 102 is moved along the shaft 44 and is loosely placed adjacent bracket 20 such that the stem 34 projects within the annular wall 106 of the adjusting sleeve 102. The adjusting plate 104 is then placed over the second end 48 of the shaft 44 and the bores 130 in the collar 118 are aligned with the bore 132 in the shaft 44. The pin 128 is then inserted through the bores 130 in the collar 118 and the bore 132 in the shaft 44 to affix the adjusting plate 104 to the shaft 44 for rotation therewith.

Once the adjusting plate 104 is affixed to the shaft 44 and the adjusting sleeve 102 is loosely positioned around the stem 34, the position of the shaft 44 and the rotor 50 may be longitudinally adjusted to provide the proper predetermined clearances between the faces 54 and 62 of the rotor 50 and the inner walls 26 and 28 of the fluid chamber 22 by longitudinally moving the shaft 44 and the rotor 50 in the required direction parallel to the axis 64, either to the left as indicated by the arrow "L" or the fight as indicated by the arrow "R". Once the shaft 44 and rotor 50 have been positioned to provide the optimum predetermined clearances between the faces 54 and 62 of the rotor 50 and the inner walls 26 and 28 of the fluid chamber 22, the adjusting sleeve 102 is moved along the shaft 44 toward the adjusting plate 104, while the rotor 50 and shaft 44 remain stationary, until the stationary seat 112 comes into contact with the rotatable seat 122. The set screws 108 are then tightened against the stem 34 to rigidly connect the adjusting sleeve 102 to the stem 34 such that the adjusting sleeve 102 cannot rotate about the axis 64 or move longitudinally therealong.

During operation of the pump 10, the pumping action provided by the rotation of the rotor 50 creates a hydraulic thrust force on the rotor 50 which tends to push the rotor 50 generally parallel to the axis 64 in a direction toward the cover 18. This thrust force attempts to change the clearance between the front face 62 of the rotor 50 and the front inner wall 28 of the fluid chamber 22, and the clearance between the rear face 54 of the rotor 50 and the rear inner wall 26 of the fluid chamber 22, which changes in clearance would be detrimental to the operation of the pump 10. The thrust force, if unresisted, may even push the rotor 50 into contact with the cover 18 such that the rotor 50 will score the cover 18 and otherwise cause damage to the rotor 50 and pump 10.

The thrust force which is applied to the rotor 50 during operation of the pump 10 is resisted by the thrust beating assembly 100 and specifically by the engagement of the rotatable seat 122 against the stationary seat 112 of the adjusting sleeve 102. The adjusting sleeve 102 prevents movement of the shaft 44 and the rotor 50 in a longitudinal direction towards the cover 18 and away from the adjusting sleeve 102. The thrust bearing assembly 100 thereby maintains substantially uniform clearances between the rotor 50 and the inner walls 26 and 28 of the fluid chamber 22 as the rotor 50 rotates during pumping operations. While the adjusting sleeve 102 and the adjusting plate 104 prevent movement of the shaft 44 and rotor 50 in a longitudinal direction toward the cover 18 as shown by the arrow "L", the rotatable seat 122 and the stationary seat 112 are in rotatable engagement with one another thereby allowing rotation of the shaft 44 and adjusting plate 104 with respect to the adjusting sleeve 102. The fluid within the cooling fluid chamber 88 provides lubrication between the rotatable seat 122 and the stationary seat 112.

Various features of the invention have been particularly shown and described in connection with the illustrated embodiment of the invention, however, it must be understood that these particular arrangements merely illustrate, and that the invention must be given its fullest interpretation within the terms of the appended claims.

What is claimed is:

1. A pumping assembly including a positive displacement pump with a bracket and a housing defining an internal fluid chamber having front and rear inner walls; a rotor positioned in said fluid chamber, said rotor having a front face and a rear face, each of said faces spaced apart from a corresponding inner wall of said fluid chamber to define predetermined clearances therebetween; a shaft having a first end connected to said rotor to effect rotation thereof; a sealed container surrounding and enclosing a second end of said shaft, the interior of said container being in communication with said fluid chamber; a thrust bearing assembly positioned within said container, said bearing assembly including an adjusting sleeve and an adjusting plate, said adjusting sleeve being attachable to said bracket and having a central bore, said sleeve being positioned between said bracket and said plate such that said shaft extends through and rotates within said bore, said sleeve including a stationary seat extending around said shaft; said adjusting plate being connectable to said shaft for rotation therewith and such that said adjusting plate is in relative rotatable engagement with said stationary seat, said adjusting sleeve and said adjusting plate preventing movement of said shaft and said rotor in a direction away from said adjusting sleeve such that said predetermined clearances between said faces of said rotor and said inner walls of said chamber are substantially uniformly maintained as said rotor rotates notwithstanding forces urging longitudinal movement of said shaft.

2. The pumping assembly of claim 1 including a rotary driven member attached to said second end of said shaft for rotation therewith; a first magnetic surface carried by said driven member; a rotary drive member defining a recess therein, said driven member being located within said recess for rotation; a second magnetic surface carried by said drive member; said sealed container having a peripheral wall member disposed between said drive member and said driven member and enclosing said adjusting plate and said adjusting sleeve in conjunction with said bracket.

3. The pumping assembly of claim 1 including means for releasably attaching said sleeve to said bracket such that said sleeve is adjustably positionable along said shaft relative to said bracket thereby permitting selective adjustment of the predetermined clearances between said faces of said rotor and said inner walls of said fluid chamber.

4. The pumping assembly of claim 3 wherein said bracket includes an outwardly projecting stem and said adjusting sleeve includes an annular wall portion extending around said stem.

5. The pumping assembly of claim 4 wherein said releasable attachment means comprises a set screw threadably attached to said annular wall of said sleeve, said set screw being selectively engageable with said bracket.

6. The pumping assembly of claim 1 wherein said sleeve includes an annular wall and an annular flange extending from said annular wall defining a recess, said stationary seat being located in said recess.

7. The pumping assembly of claim 6 wherein said sleeve includes an insert located in said recess between said flange and said stationary seat.

8. The positive displacement pump of claim 6 wherein said stationary seat is made of a ceramic material.

9. The pumping assembly of claim 6 wherein said adjusting plate includes an annular collar attached to said shaft and a rotatable seat attached to said collar.

10. The pumping assembly of claim 9 wherein said rotatable seat is made of a carbon material.

11. The pumping assembly of claim 9 including a pin extending through said adjusting plate and said shaft for attaching said adjusting plate to said shaft.

* * * * *